March 25, 1930.  A. E. DEKOME  1,751,795
BALL BEARING ROLLER
Filed April 24, 1929
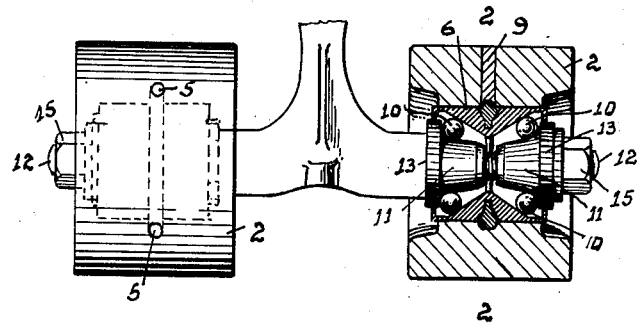
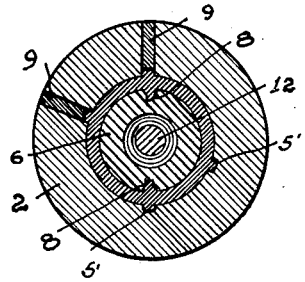 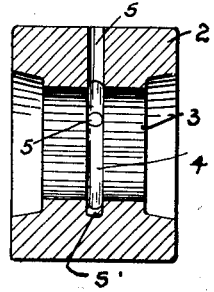 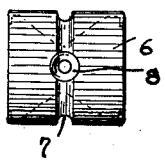
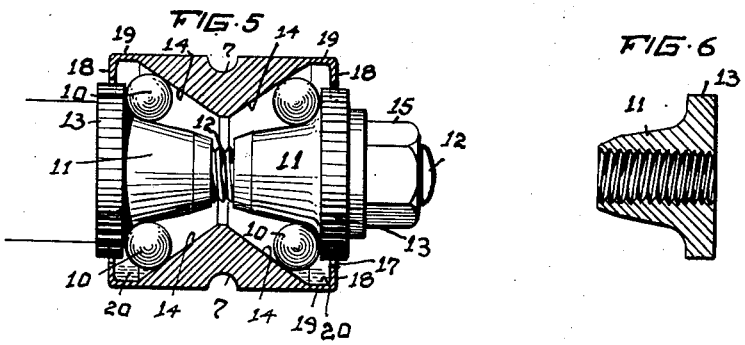 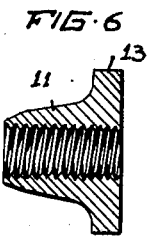
INVENTOR
ARTHUR E. DEKOME
BY Fisher, Moser & Moore
ATTORNEY Patented Mar. 25, 1930

1,751,795

UNITED STATES PATENT OFFICE

ARTHUR E. DEKOME, OF CLEVELAND, OHIO

BALL-BEARING ROLLER

Application filed April 24, 1929. Serial No. 357,724.

My invention relates to an improvement in ball bearing rollers, and the object in general of the present improvement is to provide a ball bearing roller or wheel of special utility in a roller skate, whereby friction is reduced to a minimum, wherein steel balls of different diameters may be used advantageously, and in which the race for each set of anti-friction balls is particularly constructed to pocket and conserve a supply of lubricant and to exclude dirt and prevent spattering of the lubricant while the skate is in use.

In the accompanying drawings, Fig. 1 is an elevation and sectional view of a pair of rollers embodying my improvement. Fig. 2 is a sectional view of a roller and its bearing on line 2—2 of Fig. 1. Fig. 3 is a sectional view axially of a wooden roller without its bearing. Fig. 4 is a side elevation of the bearing or bushing alone. Fig. 5 is an enlarged sectional view of the bearing members assembled without the roller or wheel, and Fig. 6 is an enlarged sectional view of one of the ball bearing cones.

The invention comprises a roller or wheel 2 made of wood and dished or recessed at opposite sides thereof. An axial bore or opening 3 extends through the body of the roller and an annular channel 4 is formed in the wall of this bore centrally of the body. A pair of radial openings 5—5 extend from the circumference of the roller to annular channel 4, and in drilling these openings the drill is passed through axial bore 3 into the opposite side of channel 4 to produce pockets or cavities 5'—5' in the body diametrically opposite the radial openings 5—5.

A cylindrical bushing or ball race 6 made of steel having substantially the same diameter as bore 3 is pressed into the bore and fits snugly therein with the ends thereof projecting slightly into the side recesses of roller 2. An annular groove 7 is formed exteriorly of bushing 6 so that when the bushing is in place this groove lies directly opposite the annular groove 4 within roller 2. Two flaring cavities 8 of shallow depth are also provided diametrically within cylindrical bushing 6 at the bottom of groove 7, whereby locking of the bushing may be effected when babbitt or other suitable metal is forced through the radial openings 5—5 into the annular channel 4 and its matching groove 7. The Babbitt metal fills the cavities 5'—5' and flows to the same depth into the inner ends of radial openings 5—5, which are then closed by wooden plugs 9, thereby permitting the wheel or roller to be accurately balanced and to revolve freely and true on the double sets of balls 10—10 and cones 11—11 on axle 12.

The bushing or race 6 is particularly distinguished in having two reversely related flaring seats or races 14—14 for the balls, each seating surface extending outwardly on straight flaring lines at an angle of substantially thirty degrees in respect to the axis to permit the balls to bear or contact with such inclined surfaces at varying distances from the center or middle of the roller or wheel, thus permitting balls of different sizes and in greater or lesser numbers to be used in each race opposite the cones 11—11 therein. The angle of each cone is less than the race seat, and the base portion of each cone where the balls actually bear thereagainst is curved preferably to approximate the radius of the ball. The cones are screw-connected with axle 12 and the outer cone is adjustable longitudinally thereon and may be fixed in position by lock nuts 15. To prevent the entry of dust and dirt, the outer ends of the cones are also made with circular flanges 13 of approximately the same diameter as the openings 17 in the inturned flanges 18 at the opposite ends of cylindrical bushing 6. Thus, bushing 6 includes a thin wall 19 which is extended on a straight line at each end thereof beyond the straight flaring seats 14—14 therein, and the flanges 18 project inwardly at right angles to this straight wall 19. Accordingly, when oil is used to lubricate the bearing parts, the flanges 18 operate to baffle and prevent the escape of oil during the rapid revolution of the roller while skating, thereby preventing the bearings from running dry. Also the oil is not spattered over adjacent skaters or objects. Stated in other words, the inturned flanges 18 provide annular oil pockets 20 within which any surplus of oil is free to collect, and which prevent loss of oil and spattering thereof outwardly when subjected to centrifugal force as occurs during rapid revolution of the roller.

What I claim, is:

1. A ball bearing roller, including a cylindrical bushing having reversely-inclined ball-bearing seats extending outwardly on straight lines for a substantial distance from the central zone thereof and provided with inturned oil baffling flanges and oil collecting pockets annularly at each outer end thereof.

2. A ball bearing roller, including a cylindrical bushing having reversely-inclined ball-bearing seats extending outwardly on straight lines for a substantial distance from the central zone thereof and provided with inturned oil baffling flanges and oil connecting pockets annularly at each outer end thereof, in combination with a pair of cones of lesser angle than said seats, and balls interposed therebetween.

3. A ball bearing roller having an axial bore and an annular channel therein, a cylindrical bushing having ball bearing races therein and an annular groove exteriorly thereof adapted to register with said channel when said parts are assembled, said roller and bushing having diametrically disposed openings communicating with said channel, and said channel and groove containing a locking medium, the entire assembly being evenly balanced.

4. A ball bearing roller having an axial bore, a cylindrical bushing extending through said bore having reversely-inclined ball-bearing seats formed on straight lines at an angle of substantially thirty degrees in respect to the axis of said bushing, the outer ends of said bushing having right-angled oil-baffling flanges extending toward the axis and annular oil-collecting pockets between said flanges and inclined seats, and means for fastening said bushing within said roller, in combination with a pair of ball bearing cones, separate sets of balls, an axial, and means for securing said parts adjustably together.

In testimony whereof I affix my signature.

ARTHUR E. DEKOME.